Figure 1:
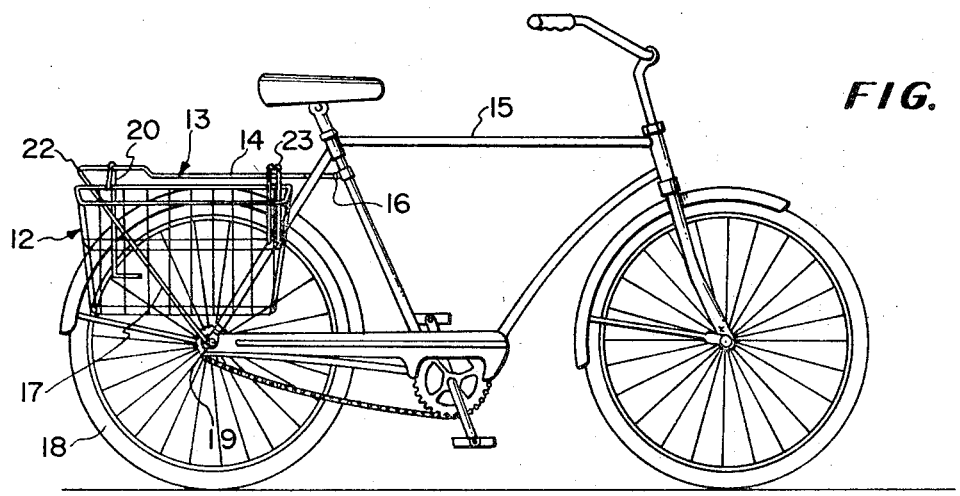

United States Patent

[11] 3,552,611

| [72] | Inventor | Mahlon J. Smith<br>Niles, Mich. |
|---|---|---|
| [21] | Appl. No. | 765,801 |
| [22] | Filed | Oct. 8, 1968 |
| [45] | Patented | Jan. 5, 1971 |
| [73] | Assignee | Androck Incorporated<br>Worcester, Mass.<br>a corporation of Massachusetts |

[54] BICYCLE SADDLE BASKETS
3 Claims, 4 Drawing Figs.

| [52] | U.S. Cl. | 224/32 |
|---|---|---|
| [51] | Int. Cl. | B62j 9/00 |
| [50] | Field of Search | 224/30, 31, 32, 32.1, 33, 34, 42 |

[56] References Cited
UNITED STATES PATENTS

| 1,154,197 | 9/1915 | Musselman | 224/32(.1) |
|---|---|---|---|
| 2,890,819 | 6/1959 | Glenny | 224/32(.1) |

FOREIGN PATENTS

| 1,102,369 | 5/1955 | France | 224/32 |
|---|---|---|---|
| 614,967 | 12/1948 | Great Britain | 224/32(.1) |
| 89,300 | 3/1957 | Norway | 224/30 |
| 168,511 | 9/1959 | Sweden | 224/32(.1) |

Primary Examiner—Gerald M. Forlenza
Assistant Examiner—Frank E. Werner
Attorney—Andrew F. Wintercorn ABSTRACT: Each saddle basket has an interfitting slip connection with the rear end of the luggage carrier consisting of a generally V-shaped portion on the carrier rack in a substantially vertical plane that fit inside a transversely disposed loop provided on the inner side of the basket, these interfitting wire parts being springable so that a resilient wedging action is obtainable when the basket is forced forwardly prior to the fastening of a clamp means provided on the forward portion of the basket, fastening the basket to the luggage carrier rack. Thus, the basket can be attached to or removed from the bicycle in a few minutes and, therefore, need not be an incumbrance on the bicycle when it is not going to be used.

PATENTED JAN 5 1971

3,552,611

SHEET 1 OF 2

INVENTOR
MAHLON J. SMITH

Attorney

PATENTED JAN 5 1971 3,552,611

SHEET 2 OF 2

INVENTOR:
MAHLON J. SMITH

Andrew F. Wintercorn
Attorney

BICYCLE SADDLE BASKETS

This invention relates to new and improved dual carrier baskets for application to the opposite sides of the rear portions of bicycles, the present ones being designed for separate application to and removal from the bicycle, hooking onto the luggage rack so that only a single clamping connection elsewhere suffices to give the basket secure fastening, and yet the basket can be taken off and replaced readily, removability of the baskets leaving the bicycle unencumbered for general use during the many intervals when a saddle basket or baskets are not needed or wanted. In accordance with my invention a loop or eye is provided on the inner side of the rear portion of each saddle basket to receive the generally V-shaped rear upper side portion of the luggage carrier rack with a wedging fit, and a laterally projecting bracket provided on the front end of the basket is arranged to rest on top of the luggage carrier rack and be clamped thereto with a single screw and clamp plate, thereby making it an easy matter to apply the basket or remove it, single baskets being available for application to the right and left side of the luggage carrier rack as desired, if a pair of such baskets is needed.

Figure 2:
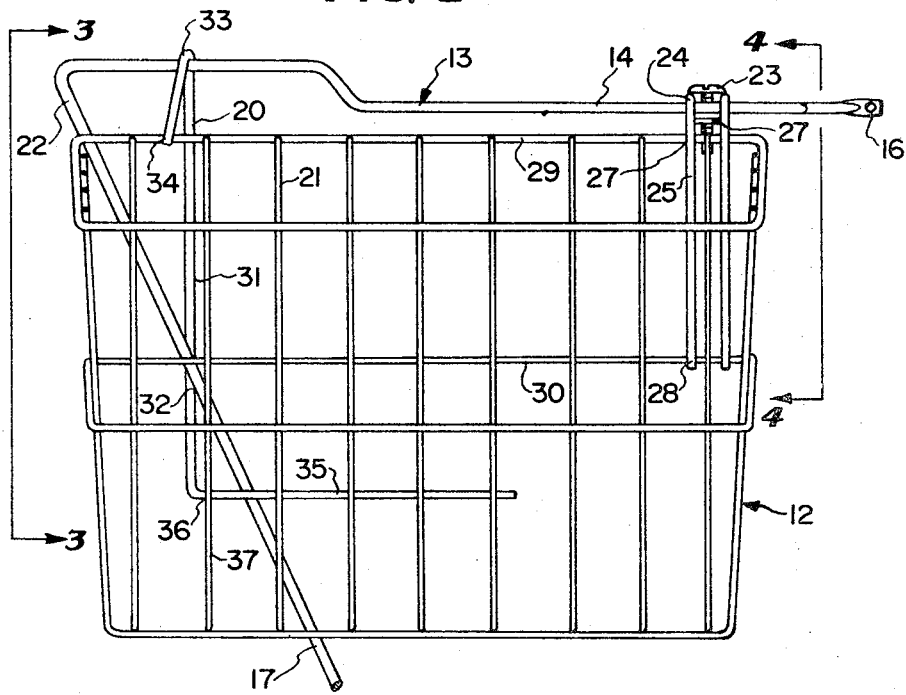
Figure 3:
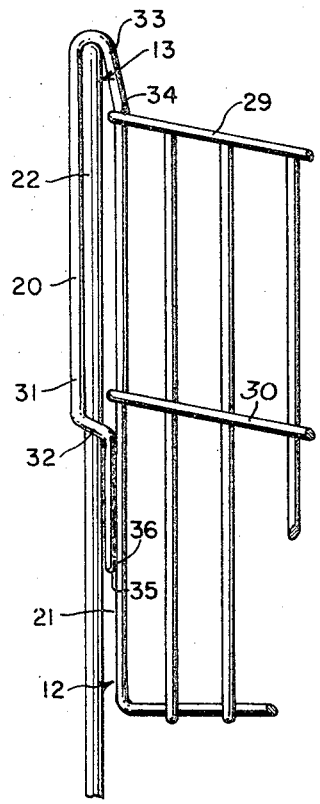
Figure 4:
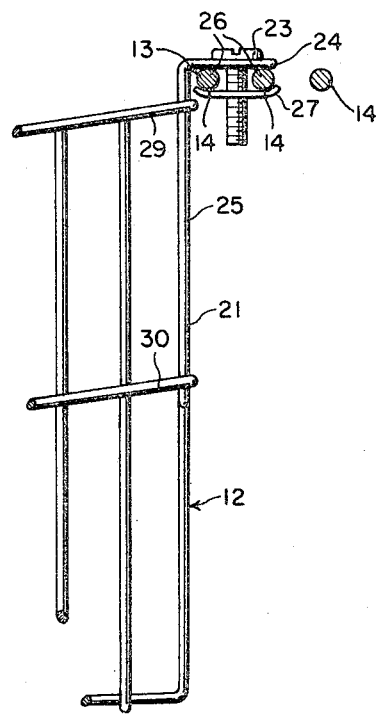

The invention is illustrated in the accompanying drawings, in which:

FIg. 1 is a side view of a bicycle equipped with a saddle basket or baskets made in accordance with the invention;

FIG. 2 is an enlarged side elevation of a basket showing only enough of the luggage carrier to enable illustrating the mode of application of the basket thereto, and FIGS. 3 and 4 are fragmentary views taken on the lines 3–3 and 4–4 of FIG. 2.

The same reference numerals are applied to corresponding parts throughout the views.

Referring to the drawings, the reference numeral 12 designates a saddle basket of my invention generally, the same being shown applied to one side of the luggage carrier rack 13, the horizontal top portion 14 of which is fastened at the front end to the frame 15 of the bicycle, as shown at 16 in FIG. 1, while downwardly and forwardly extending legs 17 on opposite sides of the rear wheel 18 are suitably secured to opposite ends of the rear axle 19. A loop or "eye" 20 of elongated form vertically projects laterally inwardly from the inner sidewall 21 of the basket and is adapted to receive, as a "-hook" in an eye, the V-shaped or angular upper rear corner portion 22 on this same side of the luggage carrier 13 for connection of the rear end portion of the basket 12 to the luggage carrier, so that there is need for only one fastening screw 23 for fastening the front end portion of the basket to the luggage carrier, as by clamping the laterally projecting portion 24 of an L-shaped wire bracket 25 to two neighboring spaced parallel horizontal wires 26 in the top of the luggage carrier 13, the screw 23 passing between two of these wires and being threaded in a hole in the middle of a sheet metal clamp plate 27 that underlies these two wires and is drawn up into firm engagement with the under side thereof, clamping the bracket 25 firmly to the luggage carrier. The bracket 25 is formed from a single piece of wire bent to U-shape having the two legs of the inverted U welded at 27 and 28 to the inner side of the wire top frame 29 and median frame 30 of the basket 12, respectively. This gives the necessary strength and rigidity when the right angle bent upper end portion 24 of the bracket is clamped onto the top 14 of the luggage carrier 13 by the tightening of the single screw 23 in the clamp plate 27. The loop or eye 20 is also formed of one piece of wire of generally L-shape, its vertical leg 31 being bent outwardly, as at 32, relative to the inner wall 21 of the basket to define the lower end of the eye, while the upper end of the vertical leg 31 is bent outwardly and downwardly in the form of a hook, as at 33 (FIG. 3), and welded, as at 34, to the inner side of the top frame 29 of the basket. The horizontal leg 35 of the L-shaped wire is welded, as 36 to five of the vertically extending wires 37 of the inner wall 21 of the basket. In that way the hook and eye connection with the V-shaped rear corner portion of the luggage carrier is given the necessary strength and rigidity, and the saddle basket will easily carry the anticipated loads without bending out of shape itself or having its hook-on connection with the luggage carrier bent out of shape and working loose and causing rattle. In this connection it should be noted that due to the converging of the wires defining the upper rear corner portion 22 of the luggage carrier, there is a resilient wedging action if the user presses the basket forwardly before tightening the clamp screw 23. If the basket works loose later relative to the luggage carrier the play can be taken up easily by first loosening the screw 23 and forcing the basket 12 forwardly enough to take up the play and then retightening the screw 23.

In operation, the user need not keep the saddle basket or baskets attached to the opposite sides of the luggage carrier when there is no need for them, it being such a simple matter with the present invention to remove the basket or baskets and later replace the same, and yet these baskets when applied to the luggage carrier in the manner specified are just as well supported and secured as with prior constructions, many of which are much more complicated and expensive and subject to many objections which do not apply whatsoever to the present construction. Of course, there must be "rights" and "lefts;" one cannot apply a right-hand saddle basket of the present construction to the left-hand side of the luggage carrier, or vice versa. There is no need for purchasing two baskets if the user has need for only one, which, of course, represents a considerable saving.

It is believed that the foregoing description conveys a good understanding of the objects and advantages of my invention. The appended claims have been drawn to cover legitimate modifications and adaptations.

I claim:

1. A cycle attachment of the character described comprising, in combination with a generally rectangular substantially horizontal luggage rack having an elongated side portion, a saddle basket disposed in a substantially vertical plane alongside said side portion in substantially parallel relationship thereto, and means for detachably securing said basket in rigid relationship to said rack side portion comprising a detachably interfitting slip connection of parts on said rack side portion and on the inner side of said basket interengageable by movement of said basket relative to said rack side portion in a certain direction, and clamp means on the fitting slip connection, further detachably connecting said basket to said rack side portion in the opposite direction, the interfitting slip connection comprising a generally V-shaped portion on the rack in a substantially vertical plane which fits inside a transversely disposed loop on the basket.

2. A cycle attachment as set forth in claim 1 wherein the generally V-shaped portion on the rack is of wire construction and fits inside the transversely disposed loop on the basket, which is also of wire, the wire parts being springable whereby a resilient wedging action is obtainable when the basket is forced forwardly prior to the fastening of the clamp means.

3. A cycle attachment of the character described comprising in combination with a luggage carrier having a substantially horizontal luggage rack member with rearwardly projecting side portion on the rear end which is of rearwardly converging form in a substantially vertical plane, a saddle basket disposed substantially parallel to and detachably connectable with one side of said rack member by means of an eye on a supporting bracket on the inner side of said basket interengageable with said rearwardly projecting side portion and clamp means on the inner side of said basket in forwardly spaced relationship to said bracket engageable with a portion of said rack member, said rearwardly projecting side portion being of springable wire construction, whereby a resilient wedging engagement is possible when said basket is pressed forwardly after engagement in said eye prior to the tightening of said clamp means.